United States Patent

[11] 3,568,076

[72] Inventor Alexander F. Thornhill
  Accokeek, Md.
[21] Appl. No. 789,097
[22] Filed Jan. 2, 1969
[45] Patented Mar. 2, 1971
[73] Assignee the United States of America as represented by the Secretary of the Navy

[54] RECEIVER PHASE SHIFT STABILIZER
  5 Claims, 7 Drawing Figs.
[52] U.S. Cl........................................................ 328/155, 307/232, 307/295
[51] Int. Cl........................................................ H03b 3/04
[50] Field of Search........................................ 328/155; 307/232, 295; 331/14; 332/19

[56] References Cited
UNITED STATES PATENTS
3,059,187 10/1962 Jaffe............................ 328/155X
3,206,686 9/1965 Gorr............................ 328/155

Primary Examiner—John Kominski
Assistant Examiner—James B. Mullins
Attorneys—R. S. Sciascia, A.L. Branning and J.G. Murray ABSTRACT: The invention consists of a radio receiver phase shift stabilization system which operates by intermittently directing a test signal through the receiver, measuring the phase shift of the signal, storing this information and thereafter compensating for any subsequent change in phase shift.

INVENTOR
ALEXANDER F. THORNHILL

BY

ATTORNEY

INVENTOR
ALEXANDER F. THORNHILL

RECEIVER PHASE SHIFT STABILIZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention was developed for use in the Omega Aircraft Navigation System Receiver. The characteristics of the receiver pertinent to this invention are that it is used to measure the phases of radio signals from four Omega transmitters at any two of the frequencies radiated by the stations. The frequencies are in the 10 kHz. to 14 kHz. band. The phase measurement is performed by amplification and filtering of the signals after their arrival at the receiving antenna and by comparing the phases of the received signals with a local phase standard. The resulting measurements of phase are then processed in a computer to determine the location of the receiver and other navigational data.

The purpose of the invention is to insure that the phase shift added to the signals during passage through the receiver is either negligible or constant. The need for the invention arises from the fact that filters used in separating the incoming signals from noise and interference have phase shift characteristics which vary with temperature, pressure, signal level, and age. Since variations in phase shift through the receiver appear directly as errors in the resulting phase measurements against the local phase standard, it is desirable to minimize the effect of these changes. As an indication of the magnitude of the problem, the wavelength of the Omega signal at 10.2 kHz. is approximately 16 nautical miles, so an error in phase measurements of 10 percent of a cycle or 36° corresponds to a position error of 1.6 nautical miles. The filters used exhibit phase shifts of approximately 36° for an 18° C. change in temperature, which is not an unusual temperature range for aircraft equipment.

Some prior art systems have attempted to eliminate the problem by using broadband filters. This approach is obviously unacceptable in that a large amount of noise and interference is allowed into the receiver. Another approach has been to balance out the phase shift by processing the phase standard through circuits identical to the signal processing circuits. This is impractical due to the cost of providing duplicate receiver-processing circuits and the impossibility of providing perfectly matched components. Still another approach has been to measure phase differences between pairs of signals. However this technique requires the reception of signals from three stations to determine receiver location, while the use of independent phase measurements allows use of only two stations. Still another method has been to use a part of the received signal as the test signal. This requires additional circuits for separating the test pulse from the remainder of the received signal and further requires a high signal to noise ratio in the received signal.

SUMMARY OF THE INVENTION

In order to solve the difficulties associated with the prior art techniques the invention incorporates means for intermittently monitoring the phase shift of a test signal through a receiver, storing this information, calibrating the system in reference to this particular shift and thereafter compensating for any further change in the phase shift.

It is therefore an object of the invention to provide a system for stabilizing the phase shift of a signal through a receiver.

It is another object to accomplish stabilization without introducing undesirable interference and noise into the receiver.

Still another object is to accomplish phase stabilization by means of an inexpensive and dependable technique.

Another object is to achieve phase shift stabilization without requiring matched components to achieve satisfactory results.

A still further object is to provide a stabilization system which can also provide an indication of the proper functioning of the receiver.

Still another object is to provide a phase shift stabilization system which is completely independent of the received signal.

A further object is a system which is able to stabilize the phase shift by infrequent sampling and can be readily adjusted to sample at various time intervals.

DESCRIPTION OF THE PREFERRED EMBODIMENT

Figure 1:
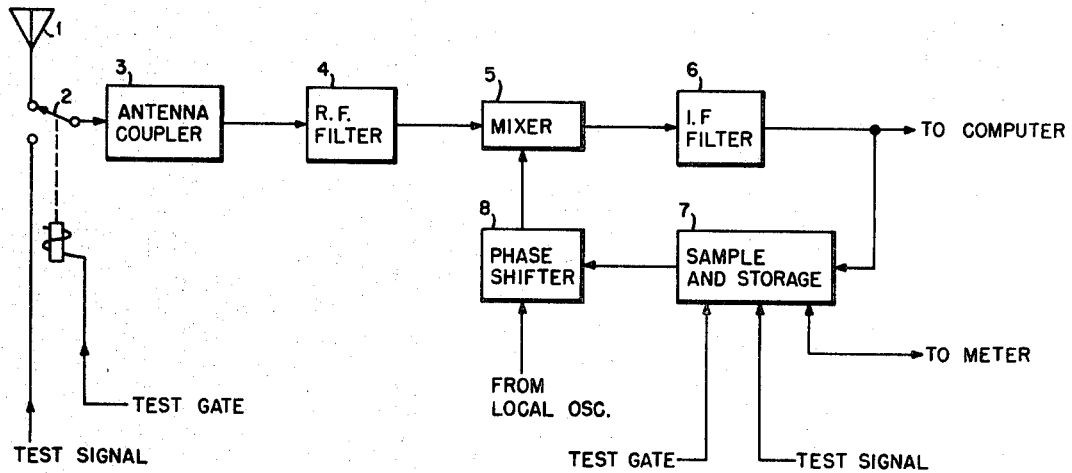
FIG. 1 is a block diagram of the significant portions of the receiver circuit.

In FIG. 1, a block diagram of the significant portions of the receiver is shown. The signals are received by the antenna 1, passed to the antenna coupler 3 through switch contacts 2, filtered and amplified in the RF filter 4, changed to the intermediate frequency in mixer 5 and further filtered and amplified in IF filter 6. The description so far is that of a standard superheterodyne receiver. The phase stabilization is implemented by periodically interrupting the normal operation of the receiver by operating switch 2 to connect a test signal to the input of the antenna coupler. This test signal is processed by the receiver exactly as a normal signal would be, and the sample and storage circuit 7 compares the phase of the processed test signal with the phase of the original test signal. The sample and storage circuit converts the phase measurement to a voltage which is used to control phase shifter 8 so as to reduce the phase error. At the end of the test period, the sample and storage circuit stores the last value of the phase error voltage. As the tests occur at 10-second intervals, neither the stored voltage nor the receiver phase shift can change appreciably between tests, and the phase shift of the signals in passing through the receiver is held as constant as the phase shift of the test signals. In the arrangement shown, some error signal is necessary to operate the phase shifter. An integrator in the sample and storage block 7 would eliminate the need for a small static error if it were desired to eliminate the phase error completely, but without the integrator the error can be reduced to a few percent of a cycle.

Figure 2:
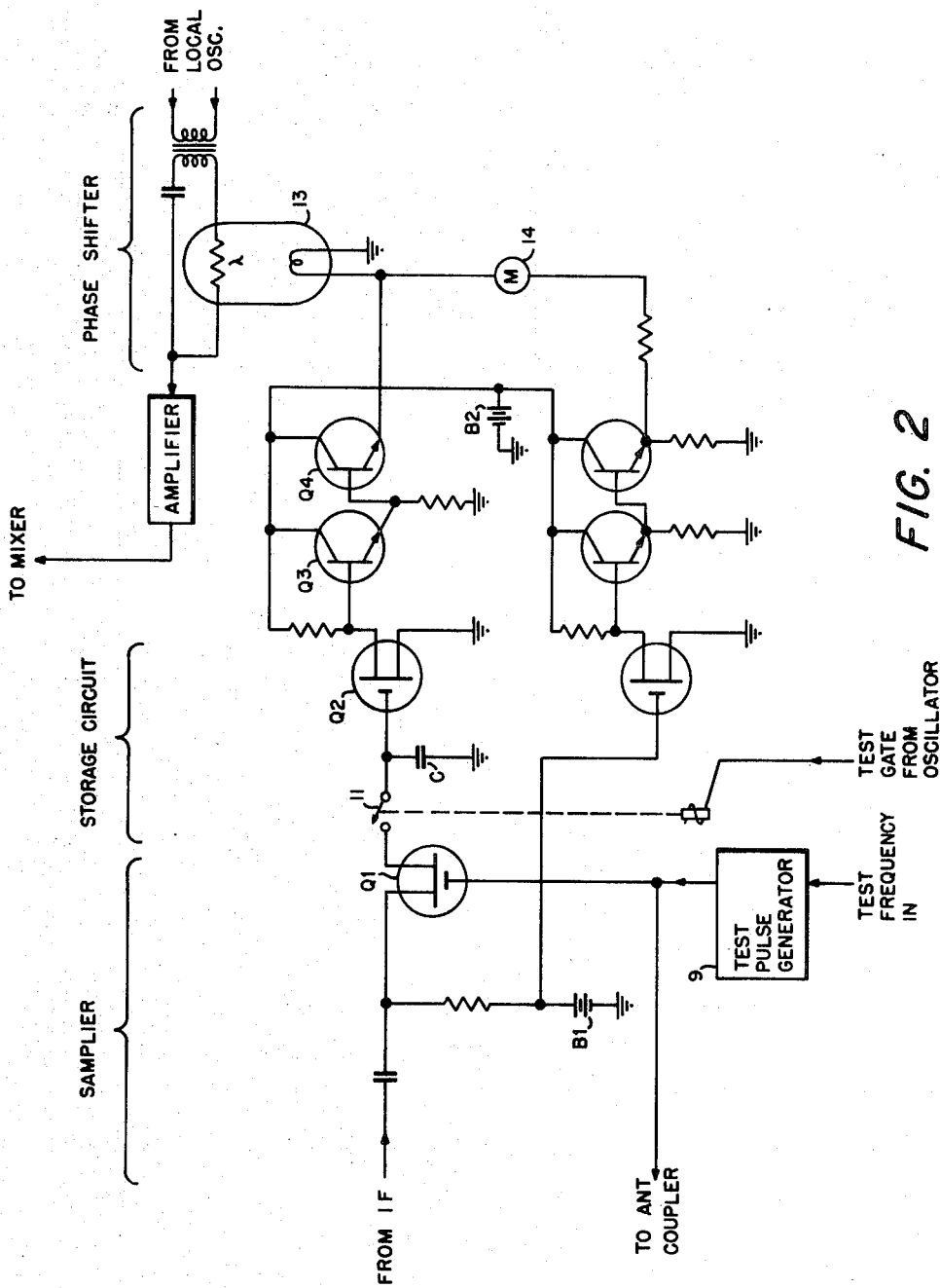
FIG. 2 is a simplified circuit diagram of the test circuits used to stabilize the phase shift.

FIG. 2 is a simplified circuit diagram of the invention. The output of the IF amplifier is connected to the input of a transistor switch, Q1. A MOSFET is used for switch Q1 to insure that the voltage is sampled accurately. The switch Q1 is turned on and off by the pulses produced by the test pulse generator 9 which is enabled by a test gate produced by an oscillator which is part of the receiver system. The frequency and duration of the test gate is a matter of design choice. In the Omega Receiver a gate of approximately one second in duration every 10 sec. is utilized. During the test gate period the pulse generator 9 is enabled, thereby generating a series of short pulses having a duration and repetition frequency (prf) chosen such that harmonics of the pulse signal can pass through the receiver front end section. This is accomplished by selecting the (prf) of the test pulses to be a submultiple of the receiver intermediate frequency and of the signal frequencies. The test gate also allows the test signal out of the pulse generator to pass into the antenna coupler by energizing switch 2 of FIG. 1.

Figure 3A:
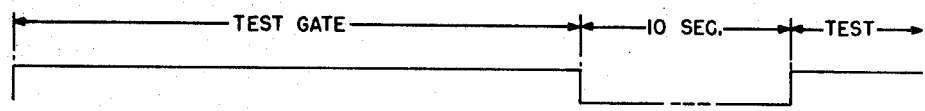
FIGS. 3A—3E show the waveforms used in the system.
Figure 3B:
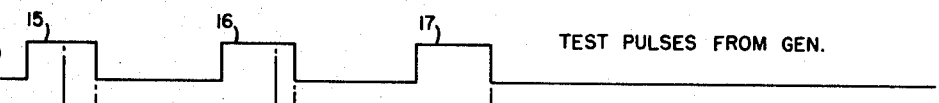
Figure 3C:
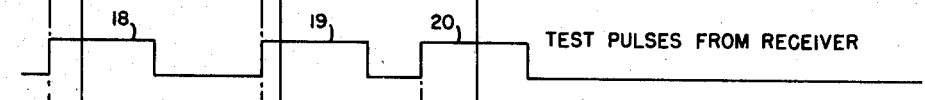
Figure 3D:
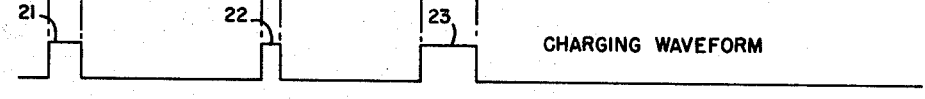
Figure 3E:
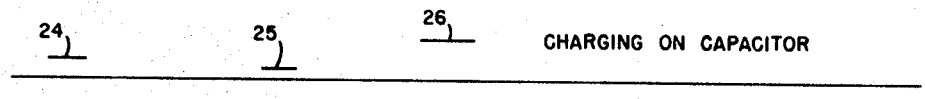

The operation of the invention will now be explained in more detail. A test gate pulse FIG. 3A enters the system approximately every 10 sec. and activates switches 2 of FIG. 1 and 11 of FIG. 2. The test gate also enables the test pulse generator, the output of which is shown in FIG. 3B. The pulses out of the test generator 9 travel along parallel paths to Q1 and to the antenna coupler 3 of FIG. 1. After processing through the receiver the test pulses arrive at Q1 and are represented in FIG. 3C. Notice that a phase shift has been added to the test pulse in its travel through the receiver. Switch Q1 is enabled by the test pulses, FIG. 3B, and will thereby gate through that portion of the processed signal which arrives at Q1 prior to the disabling of Q1. Looking at FIG. 3C it is seen that pulse 21 represents that portion of pulse 18 which is gated through Q1 and is representative of the phase shift caused by the receiver. The output of Q1 is fed into a capacitor C which will charge to the average value of the output illustrated in FIG. 3E. Capacitor C will therefore carry a charge which is a function of the phase shift of the test signal through the receiver. The resistance of Q1 and capacitance of C constitute a low-pass filter, so the voltage on C is nearly pure DC. This voltage is read from the capacitor by the amplifier composed of Q2, Q3 and Q4. Q2 is a MOSFET, which has an extremely high input resistance. Q3 and Q4 are emitter followers which increase the current available from Q2. The output of Q4 is used to illuminate the lamp in the photoconductive cell-lamp module 13. The resistance of the photoconductive cell forms the resistive part of a standard RC phase shifter circuit inserted between the receiver local oscillator and the mixer. The voltage on the lamp controls the resistance of the photoconductive cell, which in turn controls the phase shift of the local oscillator before it reaches the mixer. The phase of the local oscillator signal determines the phase of the IF output, which is measured by the sampling switch, Q1, closing the feedback loop. At the end of the test period, the test pulse generator is turned off and switch 11 is opened so that C cannot discharge back through Q1. The voltage on C as read by the Q2, Q3 and Q4 amplifier continues to control the lamp. The input resistance of Q2 is so high that the capacitor voltage does not change appreciably before the next test, so the phase shift of the receiver is effectively locked at the value determined during the test until another test cycle occurs, 10 seconds later. The amplifier composed of Q5, Q6 and Q7 is essentially a duplicate of Q2, Q3 and Q4 and is provided only so that a zero-center meter can be used as an error indicator for the system. The duplicate amplifier, connected to the same bias source as Q1, insures that the meter zero does not change with temperature or voltage variations.

Looking again at FIG. 3 it can be assumed by way of explanation that pulses 15, 18, 21 and DC voltage 24 represent the normal phase shift of a received signal. The receiver would then be calibrated with respect to this phase shift and the object of the invention would be to hold it constant. If, for example, the phase delay of the receiver increases as shown by pulses 16 and 19, the length of the pulse 22 passed by the switch Q1 will be shortened and consequently the charge on the capacitor C will be less. The charge 25 will operate to change the phase shifter and thereby stabilize the phase shift. The same principle of operation will apply if the phase shift decreases as illustrated by pulses 17, 20, 23 and 26 of FIG. 3. Again the phase shifter will respond to stabilize the system. The test pulses shown are short relative to the period of the processed test pulses, so maximum excursion of the sampler output is obtained for small phase errors. If wider test pulses were used, the output would be less sensitive to small errors, but larger errors could be sensed without saturating the system. It can be seen that for larger errors than those shown in FIG. 3 the average error voltage would not be greater, but a wider test pulse would permit the output to continue changing for larger errors. FIG. 3 has been used for illustrative purposes and does not reflect the normal operation of the receiver since phase shift variations are not apt to occur within a single test gate period.

This invention circumvents the disadvantages of the old method by measuring and correcting the actual phase variations. It does this with a minimum amount of compact, inexpensive circuitry. The method does not require matching of components or other constraints on design, and the phase reference need not be near the signal frequency. The last characteristic simplifies the reception of different signal frequencies, as the reference frequency does not require changing. An additional feature of the invention is that it provides a nearly complete test of the functioning of the receiving system, and the meter output can be arranged to operate an alarm whenever failure occurs.

Since the invention as described is a feedback system consisting of a test signal, an error detector, storage element, and a compensating phase shifter, many variations are possible. Although a pulse having harmonics at all signal frequencies and at the intermediate frequency is the simplest type of test signal, individual frequencies of known phase relationship could be used instead. The error detector is also one of the simplest types, but any phase sensitive detector could be used. The storage element used, a capacitor, is simple and completely satisfactory in the system described, but if a longer storage time were required digital storage could be used. The correcting element, a phase shifter, controls the phase of the local oscillator, but could as well be placed in the RF or IF portions of the receiver. The receiver considered is a superheterodyne very-low-frequency radio receiver but the principle of this invention is as applicable to a TRF receiver or to any other signal-processing system in which phase shift is important and in which short test periods are permissible. Another method of implementation, which would be particularly applicable to a system in which the phase data is processed by computer, is the detection and storage of the test phase shift in the computer and the subsequent addition of the required correction to phase measurements of the signals. This implementation would eliminate the requirement for a correcting element in the receiver and would permit the process to be performed digitally. The system is independent of any externally received signal and can be adjusted to test for phase shift variations at either less or greater time intervals by a change in the length of the oscillator test gate repetition time.

I claim:

1. An automatic phase-stabilizing system for compensating for variations in the phase shift of a received signal through a receiver section, comprising:
   test signal generating means for producing a signal suitable for passing through said section;
   means coupled to said generating means for intermittently directing said test signal through said receiver section;
   phase-measuring means coupled to said receiver section for producing an output proportional to the phase shift of said test signal through said sections, said phase-measuring means including means for storing said output between said intermittent passings of said test signal through said receiver section; and
   whereby said received signals undergo a constant phase shift through said receiver section.

2. The stabilizing system recited in claim 1 wherein said test signal generating means comprises a pulse-generating means.

3. The stabilizing system recited in claim 2 wherein said phase measuring means comprises:
   a gate coupled to said receiver section;
   means for enabling said gate for the duration of each of said pulses from said test generator; and
   averaging means coupled to said gate for producing an output proportional to the average value of the output of said gate.

4. The stabilizing system recited in claim 3 wherein said phase shifting means includes a variable resistance coupled to said phase measuring means and responsive thereto.

5. The stabilizer as recited in claim 3 wherein said averaging means includes:
   a capacitor;
   switch means for coupling said capacitor to said gate upon the passage of a test signal through said receiver section; and
   high impedance means coupled to said capacitor for inhibiting the discharge of said capacitor between said intermittent passings of said test signal through said section.